(12) United States Patent
Zhang et al.

(10) Patent No.: US 10,664,091 B2
(45) Date of Patent: May 26, 2020

(54) ELECTRONIC DEVICE CONDITION CONTROL

(71) Applicant: Lenovo (Beijing) Limited, Beijing (CN)

(72) Inventors: Shuxian Zhang, Beijing (CN); Shan Qiao, Beijing (CN); Zhaolin Teng, Beijing (CN); Yue Wang, Beijing (CN); Zhilu Yin, Beijing (CN)

(73) Assignee: Lenovo (Beijing) Limited, Beijing (CN)

( * ) Notice: Subject to any disclaimer, the term of this patent is extended or adjusted under 35 U.S.C. 154(b) by 195 days.

(21) Appl. No.: 15/612,085

(22) Filed: Jun. 2, 2017

(65) Prior Publication Data
US 2017/0351375 A1  Dec. 7, 2017

(30) Foreign Application Priority Data
Jun. 3, 2016  (CN) .......................... 2016 1 0391406

(51) Int. Cl.
*G06F 3/041* (2006.01)
*G06F 1/16* (2006.01)

(52) U.S. Cl.
CPC .......... *G06F 3/0416* (2013.01); *G06F 1/1618* (2013.01); *G06F 1/1643* (2013.01); *G06F 2203/04105* (2013.01)

(58) Field of Classification Search
CPC ..................................... G06F 1/1618
See application file for complete search history.

(56) References Cited

U.S. PATENT DOCUMENTS

| | | | |
|---|---|---|---|
| 2014/0043259 A1* | 2/2014 | Park ...................... | G06F 3/0412 345/173 |
| 2014/0078046 A1* | 3/2014 | Seo ....................... | G06F 1/1652 345/156 |

* cited by examiner

*Primary Examiner* — Gustavo Polo
(74) *Attorney, Agent, or Firm* — Ference & Associates LLC

(57) ABSTRACT

One embodiment provides a method, including: acquiring a first form parameter of at least one electronic device; determining whether the first form parameter meets a first preset condition; determining whether a display of the at least one electronic device is in a first state; generating a control instruction when the first form parameter meets the first preset condition and the display is in the first state; and executing the control instruction. Other aspects are described and claimed.

20 Claims, 5 Drawing Sheets

ELECTRONIC DEVICE CONDITION CONTROL

CLAIM FOR PRIORITY

This application claims priority to Chinese Application No. 201610391406.6, filed on Jun. 3, 2016, which is fully incorporated by reference herein.

TECHNICAL FIELD

The present subject matter described therein relates to the field of electronic technologies, and in particular to a control method, using state conditions, of an electronic device.

BACKGROUND

With the development of electronic technology, various electronic products have become available, particularly consumer electronic devices, such as tablets, smart phones, laptops, 2-in-1 laptop/tablets, and the like.

To make the electronic devices easy to use, these electronic devices are provided with displays from which users can view the displayed content with ease. When an electronic device is in use, the backlight of the display is usually turned on, and the display is in a bright-screen state. If the electronic device is not in use, the display is turned off for power saving, referred to as a black-screen state. When an electronic device is in use, it can be held or placed by a user in different orientations.

BRIEF SUMMARY

In summary, one aspect provides a method, comprising: acquiring a first form parameter of an at least one electronic device; determining whether the first form parameter meets a first preset condition; determining whether a display of the at least one electronic device is in a first state; generating a control instruction when the first form parameter meets the first preset condition and the display is in the first state; and executing the control instruction.

Another aspect provides an electronic device, comprising: a display device; a processor; a memory device that stores instructions executable by the processor to: acquire a first form parameter of an electronic device; determine whether the first form parameter meets a first preset condition; determine whether a display of the electronic device is in a first state; generate a control instruction when the first form parameter meets the first preset condition and the display is in the first state; and execute the control instruction.

A further aspect provides a product comprising: a storage device having code stored therewith, the code being executable by the processor and comprising: code that acquires a first form parameter of an electronic device; code that determines whether the first form parameter meets a first preset condition; code that determines whether a display of the electronic device is in a first state; code that generates a control instruction when the first form parameter meets the first preset condition and the display is in the first state; and code that executes the control instruction.

The foregoing is a summary and thus may contain simplifications, generalizations, and omissions of detail; consequently, those skilled in the art will appreciate that the summary is illustrative only and is not intended to be in any way limiting.

For a better understanding of the embodiments, together with other and further features and advantages thereof, reference is made to the following description, taken in conjunction with the accompanying drawings. The scope of the invention will be pointed out in the appended claims.

DETAILED DESCRIPTION

It will be readily understood that the components of the embodiments, as generally described and illustrated in the figures herein, may be arranged and designed in a wide variety of different configurations in addition to the described example embodiments. Thus, the following more detailed description of the example embodiments, as represented in the figures, is not intended to limit the scope of the embodiments, as claimed, but is merely representative of example embodiments.

Reference throughout this specification to "one embodiment" or "an embodiment" (or the like) means that a particular feature, structure, or characteristic described in connection with the embodiment is included in at least one embodiment. Thus, the appearance of the phrases "in one embodiment" or "in an embodiment" or the like in various places throughout this specification are not necessarily all referring to the same embodiment.

Furthermore, the described features, structures, or characteristics may be combined in any suitable manner in one or more embodiments. In the following description, numerous specific details are provided to give a thorough understanding of embodiments. One skilled in the relevant art will recognize, however, that the various embodiments can be practiced without one or more of the specific details, or with other methods, components, materials, et cetera. In other instances, well known structures, materials, or operations are not shown or described in detail to avoid obfuscation.

Embodiments of the present application provide a control method and an electronic device, offering a new method in controlling electronic devices. The technical solutions in the embodiments of the present invention include the following: depending on the different orientations of an electronic device being placed or held by a user, the related functions of the electronic device can be controlled by a first form parameter of the electronic device and the states of the display. To have a better understanding of the technical solutions described above, they will be illustrated in details below with references to the figures and detailed embodiments.

Figure 1:
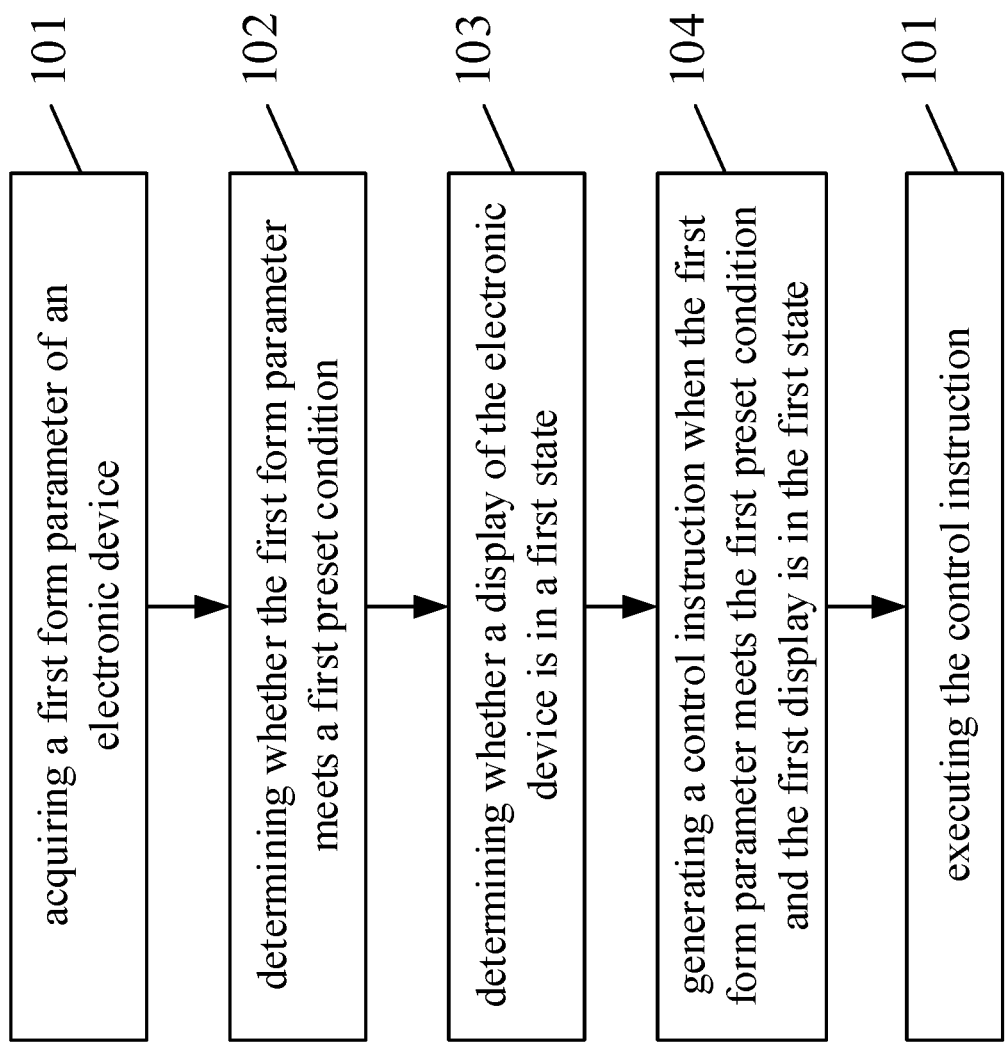
FIG. 1 is a flow diagram of a control method in an embodiment.

Referring to FIG. 1, a flow diagram of a control method provided by an embodiment. The method comprises: Step 101: acquiring a first form parameter of an electronic device; Step 102: determining whether the first form parameter meets a first preset condition; Step 103: determining whether the display of the electronic device is in a first state; Step 104: generating a control instruction when the first form parameter meets the first preset condition and the display is in the first state; Step 105: executing the control instruction.

The electronic device in an embodiment of the present invention may be, for example, a smart phone, a tablet, an e-book, a 2-in-1 laptop/tablet, or a laptop.

In practice, Steps 101 and 102 may have various implementations, and may also have different implementations in accordance with different types of electronic devices, illustrated via the examples below. For example, the user's customary holding position of an electronic device is provided with a pressure sensor. A possible implementation is that Step 101 comprises: acquiring a pressure value from the pressure sensor. Accordingly, Step 102 comprises: determining whether the pressure value is greater than a preset pressure value; and if the pressure value is greater than the preset pressure value, this indicates whether the first form parameter meets the first preset condition. By way of example, if the user is holding the electronic device, the pressure value of the pressure sensor usually exceeds the preset pressure value. The exceeding of the present pressure value makes it possible to detect whether the electronic device is being held.

Another example is an electronic device comprising a first body and a second body, wherein the first body and the second body are rotatably connected; that is, an electronic device with the first body being provided with a display, such as a laptop, a tablet and a 2-in-1 laptop/tablet. A possible implementation for Step 101 regarding such an electronic device comprises: acquiring a parameter; determining a relative position relationship between the first body and the second body based on the parameter, wherein the relative position relationship is the first form parameter.

Optionally, the acquired parameter in Step 101 may be an angle between the first body and the second body; it may also be a magnetic flux density between the first body and the second body and sensed by a Hall sensor in the electronic device. Based on the acquired parameter, a relative position relationship between the first body and the second body is then determined, which is the first form parameter.

Since the types of parameter vary, methods for acquiring the parameters are also different. Provided below are detailed descriptions for the methods in acquiring two different types of parameters.

Figure 2:
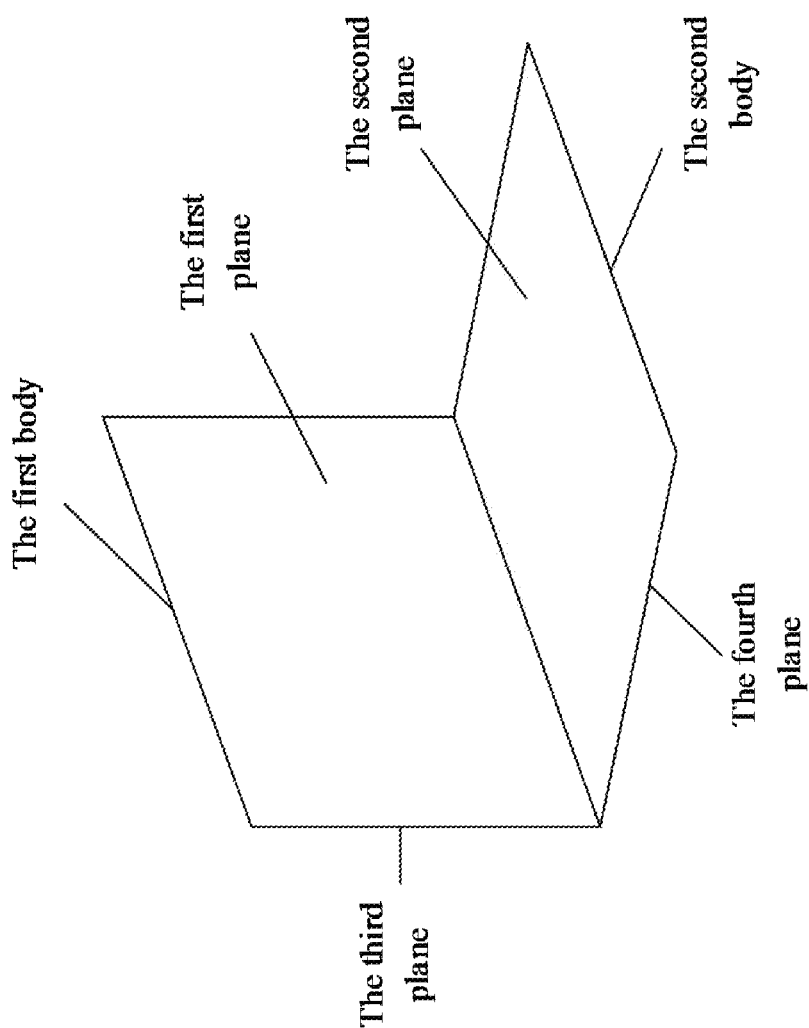
FIG. 2 is a front view of an electronic device in an embodiment.

Referring to FIG. 2 a structure diagram of an electronic device is illustrated. The electronic device comprises a first body and a second body.

In the first acquisition method, Step 101 comprises: acquiring, by the electronic device, an angle between the first body and the second body; determining a position relationship between the first body and the second body based on the angle.

As illustrated in FIG. 2, the angle between the first electronic device and the second electronic device can be an angle between 0 to 360 degrees. When the position relationship indicates that the angle between the first body and the second body is 0 degree or 360 degrees, it indicates that the first body and the second body of the electronic device are overlapped.

By way of example, the first body of the electronic device has two opposing planes, a first plane and a third plane. Likewise, the second body of the electronic device also has two opposing planes, a second plane and a fourth plane. The first body and the second body are rotatably connected via a rotation shaft. When the electronic device is off, the user usually places the first body on top of the second body; that is, the first plane of the first body and the second plane of the second body are overlapped. In other words, the third plane of the first body and the fourth plane of the second body of the electronic device become opposite to each other. If the situation is referred to as an angle between the first body and the second body, the angle between the first body and the second body is 0 degrees; and the first form parameter acquired in Step 101 is therefore 0 degrees.

As another example, when the second body of the electronic device is rotated by 90 degrees away from the first plane of the first body, the third plane of the first body of the electronic device is perpendicular to the fourth plane of the second body, as illustrated in FIG. 2. In other words, when the first plane of the first body of the electronic device is perpendicular to the second plane of the second body, it indicates that the angle between the first body and the second body is 90 degrees; and the first form parameter acquired in Step 101 is therefore 90 degrees.

As another example, when the second body of the electronic device is rotated by 360 degrees away from the first plane of the first body, the first body and the second body are overlapped with a back-to-back orientation; that is, the third plane of the first body of the electronic device overlaps with the fourth plane of the second body. In other words, when the first plane of the first body of the electronic device overlaps with the second plane of the second body, the angle between the first body and the second body is 360 degrees; and the first form parameter acquired in Step 101 is therefore 360 degrees.

The second acquisition method includes Step 101, comprising: detecting a magnetic flux density by a Hall sensor installed in the electronic device; determining a relative position relationship between the first body and the second body based on the magnetic flux density, and the relative position relationship is the first form parameter.

By way of example, the electronic device can detect a magnetic flux density between the first body and the second body through a Hall sensor, so as to determine whether the first body and the second body of the electronic device are closer to or further away from each other. When the detected magnetic flux density reaches a preset value, it indicates that the electronic device is in a tablet mode; that is, the third plane of the first body and the fourth plane of the second body of the electronic device are overlapped. For example, when a user watches a video on the electronic device, the second body is rotated by 360 degrees to a back-to-back orientation and therefore is overlapped with the display.

It should be noted that the overlapping of the first body and the second body of the electronic device also includes an overlapping of the first body and the second body with a face-to-face orientation. For example, when the electronic device is not in use and is set in an off or standby mode, in this case, the electronic device is detected by a Hall sensor to be in a non-tablet mode.

As another example, when the first body and the second body are not overlapped, e.g. the user uses the electronic device for work. The first body and the second body of the electronic device are usually separated, and the electronic device is detected by a Hall sensor to be in a non-tablet mode.

Accordingly, corresponding to the first method for acquiring a parameter in Step 101, Step 102 comprises: determining whether the first form parameter meets a first preset condition, a condition where the first body and the second body are overlapped. The overlapping of the first body and the second body could be that: the angle between the first body and the second body is 360 degrees or 0 degrees. That is, from the appearance, the third plane of the first body and the fourth plane of the second body of the electronic device are overlapped; or the first plane of the first body and the second plane of the second body are overlapped.

Corresponding to the second method for acquiring a parameter in Step 101, the preset condition could be that the magnetic flux density detected by the Hall sensor in the electronic device reaches a preset value, i.e. a condition where the electronic device is in a tablet mode.

Optionally, Step 103 can be carried out after Steps 101 and 102, or before Steps 101 and 102 are performed; or after Step 101 is but before Step 102 is performed; or concurrently with Step 101 or Step 102. In other words, no specific execution orders exist between the Step 101, Step 102, and Step 103.

Optionally, a condition of Step 103: determining whether the display of the electronic device is in a first state comprises: the display is in a bright-screen state. Certainly, in practice, to determine whether the display is in a first state may include other criteria may be configured, such as whether the display shows certain content or not, and the like.

If the acquired first form parameter meets the first preset condition and the display is in the first state, a control instruction is generated. Optionally, the generated control instruction can be used to control the enabling or disabling of a function. Optionally, the generated control instruction can be used to control the enabling or disabling of a function control switch.

Using the control instruction to control the enabling or disabling of a function can include, but not limited to, the following two circumstances: first, to control the enabling or disabling of a function of a second electronic device used in conjunction with the electronic device, wherein the function of the second electronic device may be the input function of the second electronic device.

Accordingly, in Step 105, the control instruction is sent to the second electronic device used in conjunction with the electronic device, allowing the second electronic device to perform an action corresponding to the control instruction, such as controlling the enabling or disabling of a certain function of the second electronic device. Optionally, the aforementioned second electronic device used in conjunction with the first electronic device may be a Bluetooth device, a keyboard, and the like.

By way of example, when a user works with a file, the electronic device is usually placed on top of a work desk. For ease of operation, the angle between the first body and the second body is in the range between 0 degree to 180 degrees. While working, the user may occasionally communicate with the other electronic devices via Bluetooth, such as browsing the files online. At this point, the Bluetooth of the second electronic device is in an on state. When the user wants to lay down and watch a movie after work, he will usually hold the two ends of the electronic device and rotate the second body of the electronic device to the back of the display, for ease of watching the movie. At this point, the electronic device will send a control instruction to the Bluetooth device to disable the Bluetooth function.

As another example, when the user edits a file on the electronic device, a keyboard may be used to type the input. When the editing is done and the user wants to watch a video on the electronic device, he will rotate the second body of the electronic device to the back of the display and hold the two ends of the electronic device. At this point, the electronic device will send a control instruction to the keyboard to disable the keyboard function, not affecting the video watching process.

Additionally, the second electronic device described above is for the purpose of demonstration only, not for limiting the present invention. As a result, in practice, the second electronic device may also include other auxiliary electronic devices used in conjunction with the electronic device.

The second circumstance is to control the enabling or disabling of the input function of a touch area of the electronic device, and the touch area is used to receive a touch operation from a user. Optionally, the touch area, for example, is located on the aforementioned second body.

Accordingly, Step 105 comprises controlling the enabling or disabling of the input function of a touch area of the electronic device. Optionally, the touch area of the aforementioned electronic device may be a touch keyboard, a hand/pen writing area and the like.

By way of example, when the user handles his device in a car, he may like to input information by using a touch keyboard. When the second body is rotated by 360 degrees to be in a back-to-back orientation with the first body, the electronic device disables the input function of the touch keyboard to prevent the unnecessary input of information caused by accidentally touching of the touch keyboard. In other words, no information will be inputted even if the user touches the touch keyboard.

As another example, when the user inputs information by hand/pen writing, the touch area for hand/pen writing is enabled. When the second body is rotated by 360 degrees to be in a back-to-back orientation with the first body by the user, the electronic device disables the input function of the touch area for hand/pen writing to prevent the unnecessary input of information caused by accidentally touching the touch area for hand/pen writing. In other words, no information will be inputted even if the user touches the touch area for hand/pen writing.

Optionally, using the control instruction to control the enabling or disabling of a function control switch can include, but is not limited to, the following two circumstances: first, to control the enabling or disabling of a function control switch of a second electronic device used in conjunction with the electronic device, wherein the function control switch is used to control the enabling or disabling of the function of the second electronic device, and the function may be an input function.

Accordingly, in Step 105, the control instruction is sent to the second electronic device used in conjunction with the electronic device, allowing the second electronic device to perform an action corresponding to the control instruction, such as controlling the enabling or disabling of a certain function control switch of the second electronic device.

By way of example, when the user works with files on the electronic device, the switch for controlling the Bluetooth device is enabled. When the second body is rotated by 360 degrees to be in a back-to-back orientation with the first body and the user is holding the electronic device to browse web pages, the electronic device sends a control instruction to the control switch of the Bluetooth device to disable the Bluetooth function. In other words, in this case, the Bluetooth device cannot be turned on even by clicking the control switch of the Bluetooth device.

As another example, when the user wants to video chat via a camera, the switch of the camera is enabled. When the second body is rotated by 360 degrees to be in a back-to-back orientation with the first body and the user holds the electronic device to watch videos, the electronic device sends a control instruction to the control switch of the camera to disable the camera function. In other words, in this case, the camera cannot be turned on even by clicking the control switch of the camera.

Additionally, the second electronic device described above is for the purpose of demonstration only, not for limiting the present invention. As a result, in practice, the second electronic device may also include other auxiliary electronic devices used in conjunction with the electronic device.

The second circumstance is to control the enabling or disabling of the function control switch of a touch area of the electronic device. The function control switch is used to control the enabling or disabling of the touch area.

Accordingly, Step 105 comprises controlling the enabling or disabling of a function control switch of the touch area in the electronic device, wherein the function control switch is used to control the enabling or disabling of the touch area; optionally, the touch area, for example, is located on the aforementioned second body.

Figure 3:
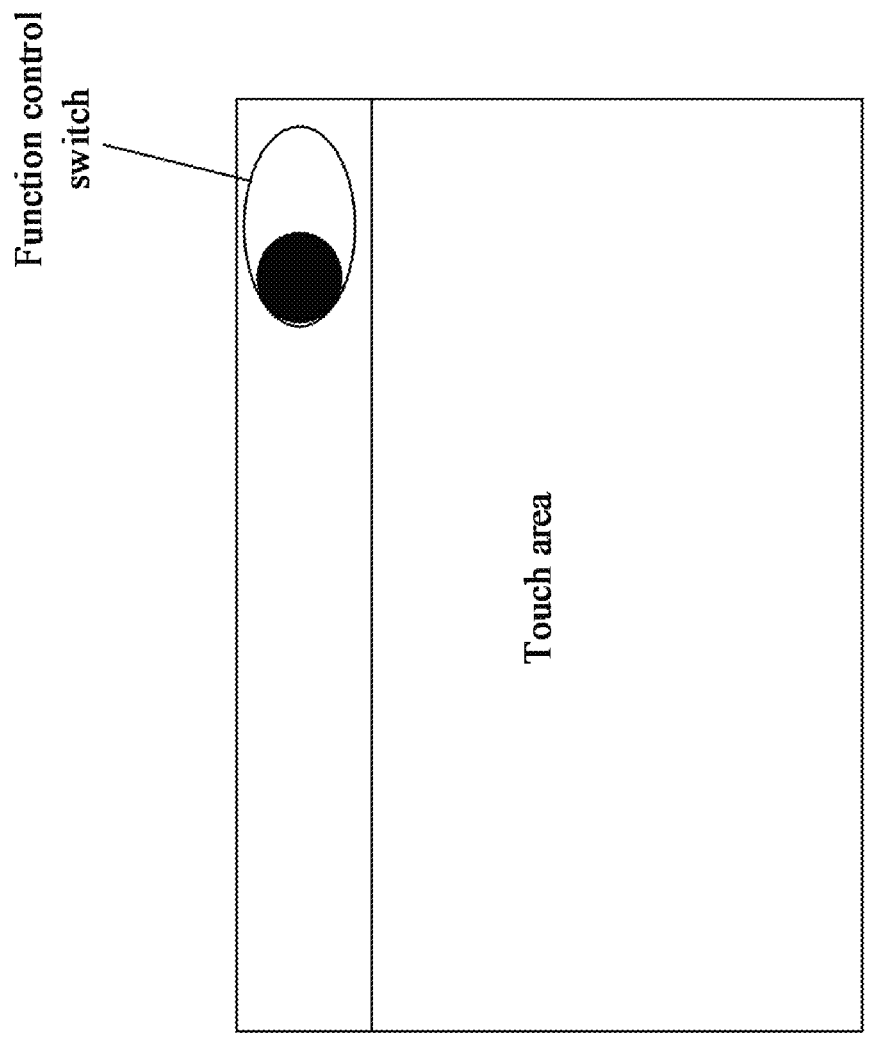
FIG. 3 is a schematic diagram of a touch area of the electronic device in an embodiment.

By way of example, the user can edit files by means of touching the area for hand/pen writing or touching the keyboard; however, when the editing is done, the user usually does not actively turn off the switch that controls the touch area. As illustrated in FIG. 3, when the second body is rotated by 360 to the back of the display and the user holds the electronic device to watch videos or browse web pages, the electronic device sends a control instruction to the switch that controls the touch area to disable the touch function. At this point, the touch area cannot be enabled even if the switch is accidentally triggered by the user. The user can watch videos or browse web pages with ease. Accidentally triggering the control switch of the touch area that results in the input function of the touch keyboard or the touch hand/pen writing of the touch area being turned on will not happen, preventing any input content popping up caused by the accidental touching on the display, and thereby improving the user experience.

Additionally, the aforementioned function control switch of the touch area may also be the volume-controlling switch or the brightness-controlling switch of a display, and the like.

From the description above, the technical solutions according to the embodiments of the present invention have the following benefits: When an electronic device is placed or held by a user in different orientations, he can control the electronic device to perform a related function via a first form parameter of the electronic device and the states of the display. This provides a new method to control an electronic device. Such a method is relatively flexible and is easy to operate by the user, thereby improving the user experience.

Figure 4:
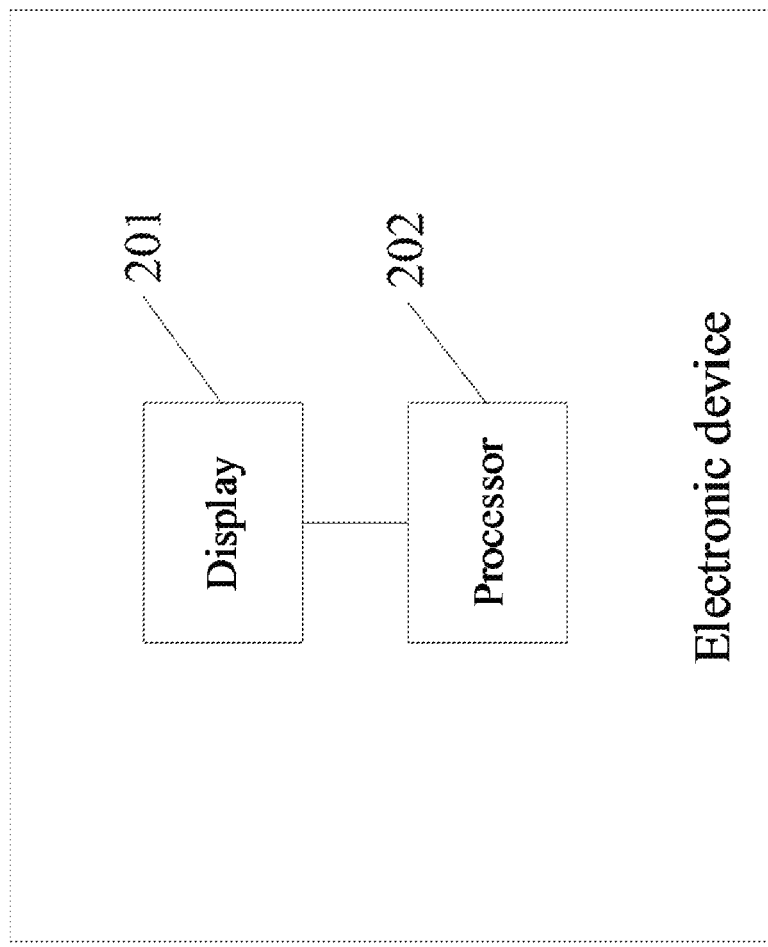
FIG. 4 is a flow diagram of an electronic device in an embodiment.

Referring to FIG. 4, a structure block diagram of an electronic device provided by an embodiment is illustrated. The electronic device may, for example, be a tablet, a desktop, and the like. The electronic device comprises: a display 201; a processor 202, for acquiring a first form parameter of the electronic device; determining whether the first form parameter meets a first preset condition; determining whether the display of the electronic device is in a first state; generating a control instruction and executing the control instruction when the first form parameter meets the first preset condition and the display is in the first state.

Optionally, the electronic device further comprises a transmitter, and the processor 202 is used to send the control instruction via the transmitter to a second electronic device used in conjunction with the electronic device, wherein the control instruction is used to control enabling or disabling of a function of the second electronic device.

Optionally, the electronic device further comprises a transmitter, and the processor 202 is used to send the control instruction via the transmitter to a second electronic device used in conjunction with the electronic device, wherein the control instruction is used to control enabling or disabling of a function control switch of the second electronic device.

Optionally, the electronic device also comprises a touch area, and the processor 202 is used to control the enabling or disabling of an input function of the touch area.

Optionally, the electronic device also comprises a touch area for receiving a touch operation from a user, and the processor 202 is used to control enabling or disabling of a function control switch of the touch area, wherein the function control switch is used to control enabling or disabling of the touch area.

Optionally, the electronic device further comprises a first body and a second body, wherein the display 201 is located on the first body, rotatably connected to the second body; the processor 202 is used for: acquiring a parameter; and based on the parameter, determining a relative position relationship between the first body and the second body as the first form parameter.

Optionally, the processor 202 is used to determine whether the relative position relationship between the first body and the second body is that the first body and the second body are overlapped, wherein the first form parameter meets the first preset condition when the first body and the second body are overlapped.

Optionally, the processor 202, in particular, may be a Central Processing Unit, an Application Specific Integrated Circuit (ASIC), may be one or more integrated circuits for controlling the program execution, may be a hardware circuit developed using Field Programmable Gate Array (FPGA), or may be a baseband processor.

Optionally, the processor 202 may comprise at least one processing core. Optionally, the electronic device further comprises a memory, and the memory may include a Read Only Memory (ROM for short), a Random Access Memory (RAM for short), and a magnetic disk memory. The memory is used to store the data required for the operation of the processor 202. There may be one or more memories.

The electronic device in this embodiment is based on a similar concept of the control method illustrated in the aforementioned FIG. 1. From the previous detailed description of the control method and its different variations, one skilled in the art should fully understand the implementation of the electronic device in this embodiment, therefore it will not be repeated herein for providing a concise specification.

Based on a similar inventive concept, an embodiment of the present invention further provides an electronic device for executing the method as is shown in FIG. 1. The electronic device may, for example, be a tablet, a desktop, and the like.

Figure 5:
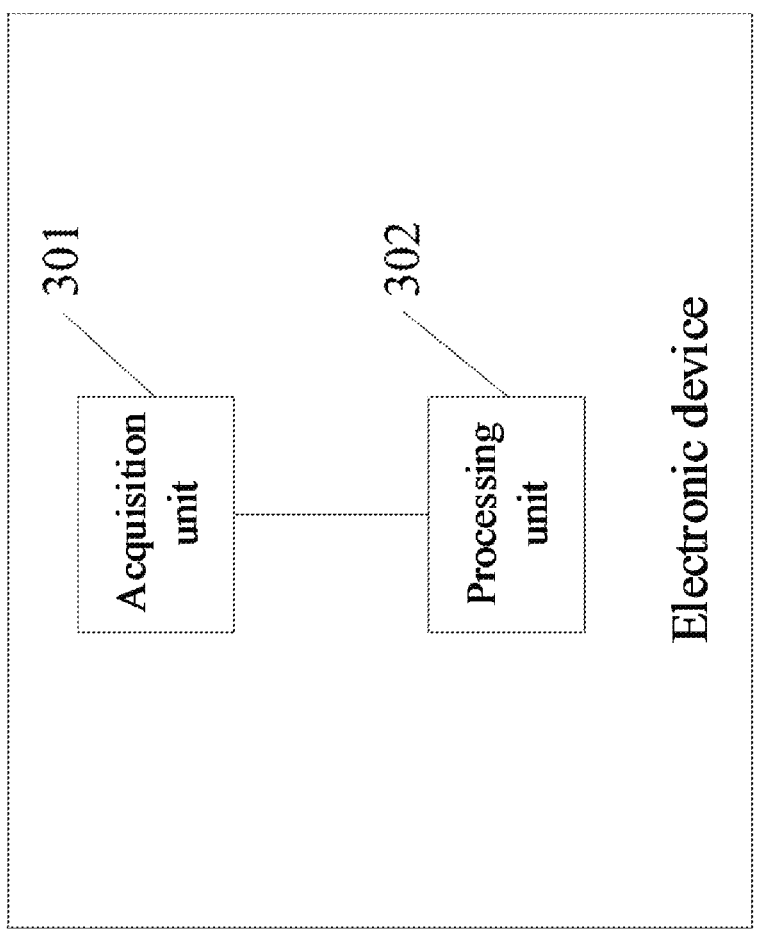
FIG. 5 is a functional block diagram of an electronic device in an embodiment.

Referring to FIG. 5, illustrating a functional block diagram of an electronic device in an embodiment. The electronic device comprises: an acquisition unit 301, for acquiring a first form parameter of the electronic device; a processing unit 302, for determining whether the first form parameter meets a first preset condition; determining whether the display of the electronic device is in a first state; generating a control instruction and executing the control instruction when the first form parameter meets the first preset condition and the display is in the first state.

Optionally, the acquisition unit 301 is used to determine a relative position relationship between the first body and the second body of the electronic device, wherein the first body and the second body are rotatably connected, and the relative position relationship is the first form parameter.

Optionally, the processing unit 302 is used to determine whether the relative position relationship between the first body and the second body is that the first body and the second body are overlapped, wherein the first form parameter meets the first preset condition when the first body and the second body are overlapped.

Optionally, the processing unit 302 is used to determine whether the display of the electronic device is in a first state; if the display is in a bright-screen state, this indicates that the display of the electronic device is in the first state.

Optionally, the control instruction is used to control the enabling or disabling of a function of a second electronic device used in conjunction with the electronic device; and the function is an input function.

Optionally, the control instruction is used to control the enabling or disabling of a function control switch of a second electronic device used in conjunction with the electronic device.

Optionally, the control instruction is used to control the enabling or disabling of the input function of a touch area of the electronic device, and the touch area is used to receive a touch operation from a user.

Optionally, the control instruction is used to control the enabling or disabling of a function control switch of a touch area of the electronic device, and the function control switch is used to control the enabling or disabling of the touch area.

The electronic device in this embodiment is based on a similar concept of the control method illustrated in the aforementioned FIG. 1. From the previous detailed description of the control method and its different variations, one skilled in the art should fully understand the implementation of the electronic device in this embodiment, therefore it will not be repeated herein.

Those skilled in the art should understand that the embodiments of the present invention may be embodied as a method, a system or a computer program product. Therefore, the embodiments of the present invention may be in the form of a hardware-only embodiment, a software-only embodiment, or an embodiment of a combination of hardware and software. Moreover, the present invention may be in the form of a computer program product which is implemented on one or more computer usable storage media (including, but not limited to, disk storage and optical storage, and the like) which contains computer usable program codes thereon.

The present invention is described with reference to the methods, devices (systems) and flow diagrams and/or block diagrams of computer program products according to the embodiments of the present invention. It should be understood that computer program instructions may be used to implement each process and/or block in the flow diagrams and/or block diagrams, and combinations of processes and/or blocks in the flow diagrams and/or block diagrams. These computer program instructions may be provided to a general computer, a dedicated computer, an embedded processor or other programmable data processing devices to generate a machine, such that the instructions, which are executed via the processor of the computer or other programmable data processing devices, create means for implementing the functions specified in one or more flows of the flow diagrams and/or one or more blocks of the block diagrams.

These computer program instructions may also be stored in a computer readable memory that can direct a computer or other programmable data processing devices to function in a particular manner, such that the instructions stored in the computer readable memory produce an article of manufacture including instruction means implementing the function specified in one or more flows of the flow diagrams and/or one or more blocks of the block diagrams.

These computer program instructions may also be loaded onto a computer or other programmable data processing devices to cause a series of operational steps to be performed on the computer or other programmable devices to produce a computer implemented process such that the instructions that are executed on the computer or other programmable devices provide steps for implementing the functions specified in one or more flows of the flow diagrams and/or one or more blocks of the block diagrams.

Specifically, the computer program instructions that correspond to a control method in the embodiment of FIG. 1 of the present application can be stored in storage media, such as an optical disk, a hard disk, a U-disk, etc. When the computer program instructions that correspond to a control method in the storage media are read or executed by an electronic device, the following steps are included: acquiring a first form parameter of the electronic device; determining whether the first form parameter meets a first preset condition; determining whether the display of the electronic device is in a first state; generating a control instruction and executing the control instruction when the first form parameter meets the first preset condition and the display is in the first state.

Optionally, the storage media also include an instruction that corresponds to the following step. When the instruction is executed, the following step is included: sending the control instruction to a second electronic device used in conjunction with the electronic device, wherein the control instruction is used to control the enabling or disabling of a function of the second electronic device.

Optionally, the storage media also includes an instruction that corresponds to the following step. When the instruction is executed, the following step is included: sending the control instruction to a second electronic device used in conjunction with the electronic device, wherein the control instruction is used to control the enabling or disabling of a function control switch of the second electronic device.

Optionally, the storage media also include an instruction that corresponds to the following step. When the instruction is executed, the following step is included: determining a relative position relationship between the first body and the second body based on the parameter, and the relative position relationship is the first form parameter.

Optionally, the storage media also includes instructions that correspond to the following step. When the instruction is executed, the following step is included: determining whether the relative position relationship between the first body and the second body is that the first body and the second body are overlapped, wherein the first form parameter meets the first preset condition when the first body and the second body are overlapped.

Optionally, the storage media also include an instruction that corresponds to the following step. When the instruction is executed, the following step is included: determining whether a third plane of the first body and a fourth plane of the second body are overlapped, wherein the first plane and the third plane are opposite to each other, the second plane and the fourth plane are opposite to each other, wherein the relative position relationship is that the first body and the second body are overlapped if the third plane of the first body and the fourth plane of the second body are overlapped.

Many variations and modifications to the present invention may be made by those skilled in the art without departing from the spirit and scope of the disclosed embodiments. Accordingly, if these variations and modifications to the embodiments fall within the scope of the claims of the present embodiments and the equivalents thereof, it is also intended that the present embodiments encompass these variations and modifications.

The technical solutions described in the embodiments may be combined freely unless they are conflict with each other. The above merely describes specific embodiments, and the protection scope of the present subject matter described therein is not limited thereto. Variations or substitutions that are within the technical scope of the present disclosure may be readily envisaged by those skilled in the art, and such variations or substitutions shall be covered by the protection scope of the embodiments.

As will be appreciated by one skilled in the art, various aspects may be embodied as a system, method or device program product. Accordingly, aspects may take the form of an entirely hardware embodiment or an embodiment including software that may all generally be referred to herein as a "circuit," "module" or "system." Furthermore, aspects may take the form of a device program product embodied in one or more device readable medium(s) having device readable program code embodied therewith.

It should be noted that the various functions described herein may be implemented using instructions stored on a device readable storage medium such as a non-signal storage device that are executed by a processor. A storage device may be, for example, a system, apparatus, or device (e.g., an electronic, magnetic, optical, electromagnetic, infrared, or semiconductor system, apparatus, or device) or any suitable combination of the foregoing. More specific examples of a storage device/medium include the following: a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a storage device is not a signal and "non-transitory" includes all media except signal media.

Program code embodied on a storage medium may be transmitted using any appropriate medium, including but not limited to wireless, wireline, optical fiber cable, RF, et cetera, or any suitable combination of the foregoing.

Program code for carrying out operations may be written in any combination of one or more programming languages. The program code may execute entirely on a single device, partly on a single device, as a stand-alone software package, partly on single device and partly on another device, or entirely on the other device. In some cases, the devices may be connected through any type of connection or network, including a local area network (LAN) or a wide area network (WAN), or the connection may be made through other devices (for example, through the Internet using an Internet Service Provider), through wireless connections, e.g., near-field communication, or through a hard wire connection, such as over a USB connection.

Example embodiments are described herein with reference to the figures, which illustrate example methods, devices and program products according to various example embodiments. It will be understood that the actions and functionality may be implemented at least in part by program instructions. These program instructions may be provided to a processor of a device, a special purpose information handling device, or other programmable data processing device to produce a machine, such that the instructions, which execute via a processor of the device implement the functions/acts specified.

It is worth noting that while specific blocks are used in the figures, and a particular ordering of blocks has been illustrated, these are non-limiting examples. In certain contexts, two or more blocks may be combined, a block may be split into two or more blocks, or certain blocks may be re-ordered or re-organized as appropriate, as the explicit illustrated examples are used only for descriptive purposes and are not to be construed as limiting.

As used herein, the singular "a" and "an" may be construed as including the plural "one or more" unless clearly indicated otherwise.

This disclosure has been presented for purposes of illustration and description but is not intended to be exhaustive or limiting. Many modifications and variations will be apparent to those of ordinary skill in the art. The example embodiments were chosen and described in order to explain principles and practical application, and to enable others of ordinary skill in the art to understand the disclosure for various embodiments with various modifications as are suited to the particular use contemplated.

Thus, although illustrative example embodiments have been described herein with reference to the accompanying figures, it is to be understood that this description is not limiting and that various other changes and modifications may be affected therein by one skilled in the art without departing from the scope or spirit of the disclosure.

The invention claimed is:

1. A method, comprising:
   acquiring a first form parameter of at least one electronic device, wherein the first form parameter is at least based upon a pressure value, wherein the pressure value is related to a user holding the at least one electronic device;
   determining whether the first form parameter meets a first preset condition;
   determining whether a display of the at least one electronic device is in a first state;
   generating a control instruction when the first form parameter meets the first preset condition and the display is in the first state; and
   executing the control instruction.

2. The method of claim 1, wherein the control instruction controls enabling or disabling of a function.

3. The method of claim 1, wherein the control instruction executes enabling or disabling of a function control switch.

4. The method of claim 1, wherein the control instruction controls enabling or disabling of a function, comprising:
   sending the control instruction to a second electronic device used in conjunction with the electronic device, wherein the control instruction is used to control enabling or disabling of a function of a second electronic device.

5. The method of claim 1, wherein the control instruction is used to control enabling or disabling of an input function, comprising:
   sending the control instruction to a second electronic device used in conjunction with the electronic device, wherein the control instruction is used to control enabling or disabling of an input function of a second electronic device.

6. The method of claim 1, wherein the control instruction executes enabling or disabling of a function control switch, comprising:
   sending the control instruction to a second electronic device used in conjunction with the electronic device, wherein the control instruction is used to control enabling or disabling of a function control switch of the second electronic device.

7. The method of claim 1, wherein the control instruction is used to control enabling or disabling of an input function of a touch area of the at least one electronic device.

8. The method of claim 1, wherein a function control switch is used to control enabling or disabling of the touch area of the electronic device, and the touch area receives a touch operation from a user.

9. The method of claim 1, wherein the display is located on a first body of the electronic device; the electronic device has a second body, rotatably connected to the first body; the method for acquiring a first form parameter of the electronic device further comprises:
acquiring a parameter; and
determining a relative position relationship between the first body and the second body based on the parameter, and the relative position relationship is the first form parameter.

10. An electronic device, comprising:
a display device;
a processor;
a memory device that stores instructions executable by the processor to:
acquire a first form parameter of an electronic device, wherein the first form parameter is at least based upon a pressure value, wherein the pressure value is related to a user holding the at least one electronic device;
determine whether the first form parameter meets a first preset condition;
determine whether a display of the electronic device is in a first state;
generate a control instruction when the first form parameter meets the first preset condition and the display is in the first state; and
execute the control instruction.

11. The electronic device of claim 10, wherein the control instruction controls enabling or disabling of a function.

12. The electronic device of claim 10, wherein the control instruction executes enabling or disabling of a function control switch.

13. The electronic device of claim 10, wherein the control instruction controls enabling or disabling of a function, comprising:
sending the control instruction to a second electronic device used in conjunction with the electronic device, wherein the control instruction is used to control enabling or disabling of a function of a second electronic device.

14. The electronic device of claim 10, wherein the control instruction is used to control enabling or disabling of an input function, comprising:
sending the control instruction to a second electronic device used in conjunction with the electronic device, wherein the control instruction is used to control enabling or disabling of an input function of a second electronic device.

15. The electronic device of claim 10, wherein the control instruction executes enabling or disabling of a function control switch, comprising:
sending the control instruction to a second electronic device used in conjunction with the electronic device, wherein the control instruction is used to control enabling or disabling of a function control switch of the second electronic device.

16. The electronic device of claim 10, wherein the control instruction is used to control enabling or disabling of an input function of a touch area of the at least one electronic device.

17. The electronic device of claim 10, wherein a function control switch is used to control enabling or disabling of the touch area of the electronic device, and the touch area receives a touch operation from a user.

18. The electronic device of claim 10, wherein the display is located on a first body of the electronic device; the electronic device has a second body, rotatably connected to the first body; the method for acquiring a first form parameter of the electronic device further comprises:
acquiring a parameter; and
determining a relative position relationship between the first body and the second body based on the parameter, and the relative position relationship is the first form parameter.

19. The electronic device of claim 10, wherein to determine whether a display of the electronic device is in a first state comprises receiving a signal from a pressure sensor.

20. A product, comprising:
a storage device having code stored therewith, the code being executable by the processor and comprising:
code that acquires a first form parameter of an electronic device, wherein the first form parameter is at least based upon a pressure value, wherein the pressure value is related to a user holding the at least one electronic device;
code that determines whether the first form parameter meets a first preset condition;
code that determines whether a display of the electronic device is in a first state;
code that generates a control instruction when the first form parameter meets the first preset condition and the display is in the first state; and
code that executes the control instruction.

* * * * *